(12) United States Patent
Lilly (10) Patent No.: US 10,513,989 B2
(45) Date of Patent: *Dec. 24, 2019

(54) METHOD AND APPARATUS FOR DETERMINING EXHAUST BRAKE FAILURE

(71) Applicant: Jacobs Vehicle Systems, Inc., Bloomfield, CT (US)

(72) Inventor: Ryan Lilly, Manchester, CT (US)

(73) Assignee: JACOBS VEHICLE SYSTEMS, INC., Bloomfield, CT (US)

( * ) Notice: Subject to any disclaimer, the term of this patent is extended or adjusted under 35 U.S.C. 154(b) by 403 days.

This patent is subject to a terminal disclaimer.

(21) Appl. No.: 15/390,512

(22) Filed: Dec. 25, 2016

(65) Prior Publication Data

US 2017/0107915 A1 Apr. 20, 2017

Related U.S. Application Data (63) Continuation-in-part of application No. 15/253,708, filed on Aug. 31, 2016, now Pat. No. 10,132,247.
(Continued)

(51) Int. Cl.
*F02D 9/06* (2006.01)
*F02D 41/22* (2006.01)
(Continued)

(52) U.S. Cl.
CPC ............... *F02D 9/06* (2013.01); *F02D 13/04* (2013.01); *F02D 41/221* (2013.01); *F02D 41/1448* (2013.01); *F02D 2200/0406* (2013.01)

(58) Field of Classification Search
CPC combination set(s) only.
See application file for complete search history.

(56) References Cited

U.S. PATENT DOCUMENTS 6,082,328 A 7/2000 Meistrick et al.
7,216,479 B2 5/2007 Tamura
(Continued)

FOREIGN PATENT DOCUMENTS

JP 2006022672 A 1/2006
JP 2008121519 A 5/2008
(Continued)

OTHER PUBLICATIONS

Written Opinion of the International Searching Authority for International Application No. PCT/US2016/068604, dated Apr. 14, 2017, 3 pages.
(Continued)

*Primary Examiner* — Binh Q Tran
(74) *Attorney, Agent, or Firm* — Moreno IP Law LLC (57) ABSTRACT

A controller of an internal combustion engine receives a request to activate an exhaust brake subsystem and, in response thereto, activates the exhaust braking subsystem. The controller thereafter determines that at least one parameter of the exhaust system, an intake subsystem or both compares unfavorably with at least one threshold. When the at least one parameter compares unfavorably with the at least one threshold, the controller determines that the exhaust braking subsystem has failed. In embodiments, the determination that the at least one parameter compares unfavorably with the at least one threshold comprises a determination that backpressure in the exhaust system is lower than a backpressure threshold and/or a determination that boost pressure in the intake subsystem is higher than a threshold.

10 Claims, 5 Drawing Sheets

Related U.S. Application Data (60) Provisional application No. 62/271,272, filed on Dec. 27, 2015, provisional application No. 62/213,002, filed on Sep. 1, 2015.

(51) Int. Cl.
  *F02D 13/04* (2006.01)
  *F02D 41/14* (2006.01)

(56) References Cited

U.S. PATENT DOCUMENTS

| | | | |
|---|---|---|---|
| 7,412,963 B2 | 8/2008 | Schmid et al. | |
| 7,565,896 B1 | 7/2009 | Yang | |
| 8,499,549 B2 | 8/2013 | Herges | |
| 8,543,288 B2* | 9/2013 | Bligard | F02D 9/06 701/34.4 |
| 8,931,263 B2* | 1/2015 | Ikeda | F01N 3/035 60/295 |
| 9,217,388 B2 | 12/2015 | Larson | |
| 9,726,086 B2 | 8/2017 | Tsutsumi | |
| 2002/0056435 A1 | 5/2002 | Yang et al. | |
| 2003/0019470 A1* | 1/2003 | Anderson | F02D 9/06 123/323 |
| 2003/0024500 A1 | 2/2003 | Rodier | |
| 2006/0060166 A1 | 3/2006 | Huang | |
| 2009/0056311 A1 | 3/2009 | Crosby et al. | |
| 2010/0293932 A1 | 11/2010 | Lhote et al. | |
| 2011/0155098 A1* | 6/2011 | Meneely | F01L 13/065 123/323 |
| 2011/0313615 A1 | 12/2011 | Bligard et al. | |
| 2012/0031372 A1 | 2/2012 | Meneely et al. | |
| 2014/0261310 A1* | 9/2014 | Troisi | F02D 9/06 123/324 |
| 2016/0084170 A1* | 3/2016 | Tsutsumi | F02D 41/18 123/323 |

FOREIGN PATENT DOCUMENTS

| | | |
|---|---|---|
| JP | 2008128114 A | 6/2008 |
| JP | 2012511668 A | 5/2012 |
| WO | 03074855 A2 | 9/2003 |

OTHER PUBLICATIONS

International Preliminary Report on Patentability for International Application No. PCT/US2016/068604, dated Jul. 3, 2018, 9 pages.
International Search Report, International Application No. PCT/US2016/049819, dated Dec. 13, 2016, 3 pages.
Written Opinion of the International Search Authority, International Application No. PCT/US2016/049819, dated Dec. 13, 2016, 17 pages.
International Search Report for International Application No. PCT/US2016/068604 and dated Apr. 14, 2017, 3 pages.
English Translation of Office Action for Korean Patent Application No. 10-2018-7021710 dated May 23, 2019, 4 pages.

* cited by examiner

METHOD AND APPARATUS FOR DETERMINING EXHAUST BRAKE FAILURE

CROSS-REFERENCE TO RELATED APPLICATION

The instant application is a continuation-in-part of prior U.S. patent application Ser. No. 15/253,708 entitled "Method and Apparatus for Combined Exhaust and Compression Release Engine Braking" and filed Aug. 31, 2016, which prior application claims the benefit of Provisional U.S. patent application Ser. No. 62/213,002 entitled "System and Method for Controlling Backpressure and System Loading" and filed Sep. 1, 2015, the teachings of which prior applications are incorporated herein by this reference. Additionally, the instant application claims the benefit of Provisional U.S. Patent Application No. 62/271,272 entitled "System and Method for Determining Potential Brake Failure" and filed Dec. 27, 2015, the teachings of which prior application are incorporated herein by this reference.

FIELD

The instant disclosure relates generally to engine braking and, more particularly, to a method and apparatus for combined exhaust and compression release engine braking.

BACKGROUND

Engine braking systems have been known and used for decades in conjunction with internal combustion engines, particularly diesel engines. Such systems include compression release brakes and exhaust brakes. These braking systems may be used alone or in combination with the other.

In simple terms, a compression release brake takes the load off the standard service brake by turning the internal combustion engine into a power-absorbing air compressor using a compression-release mechanism. When a compression release type brake is activated, the exhaust valves of one or more unfueled cylinders are opened near the top of the compression stroke. This releases the highly compressed air through the exhaust system with little energy returned to the piston. As the cycle repeats, the energy of the vehicle's forward motion (as transmitted through the vehicle's drive train to the engine) is dissipated, causing the vehicle to slow down.

In contrast, an exhaust brake uses exhaust back pressure within the engine to significantly increase braking power by restricting the flow of exhaust gases and increasing back pressure inside the engine. As used herein, engine exhaust back pressure is that pressure produced by the engine to overcome the hydraulic resistance of the engine's exhaust system in order to discharge the gases into the atmosphere. The increased backpressure in the engine creates resistance against the pistons, slowing the crankshafts rotation and helping to control the vehicle speed.

As known in the art, compression release and exhaust engine brakes can be used together to achieve substantial levels of braking power. Unfortunately, one of the disadvantages in a combination compression release and exhaust brake is high system loading seen by the overhead or valve train, i.e., those components that normally transmit valve actuation motions to the engine valves, such as cams, rocker arms, cam followers (roller or flat), etc. particularly during a transient event. An example of this is illustrated in FIG. 1.

Figure 1:
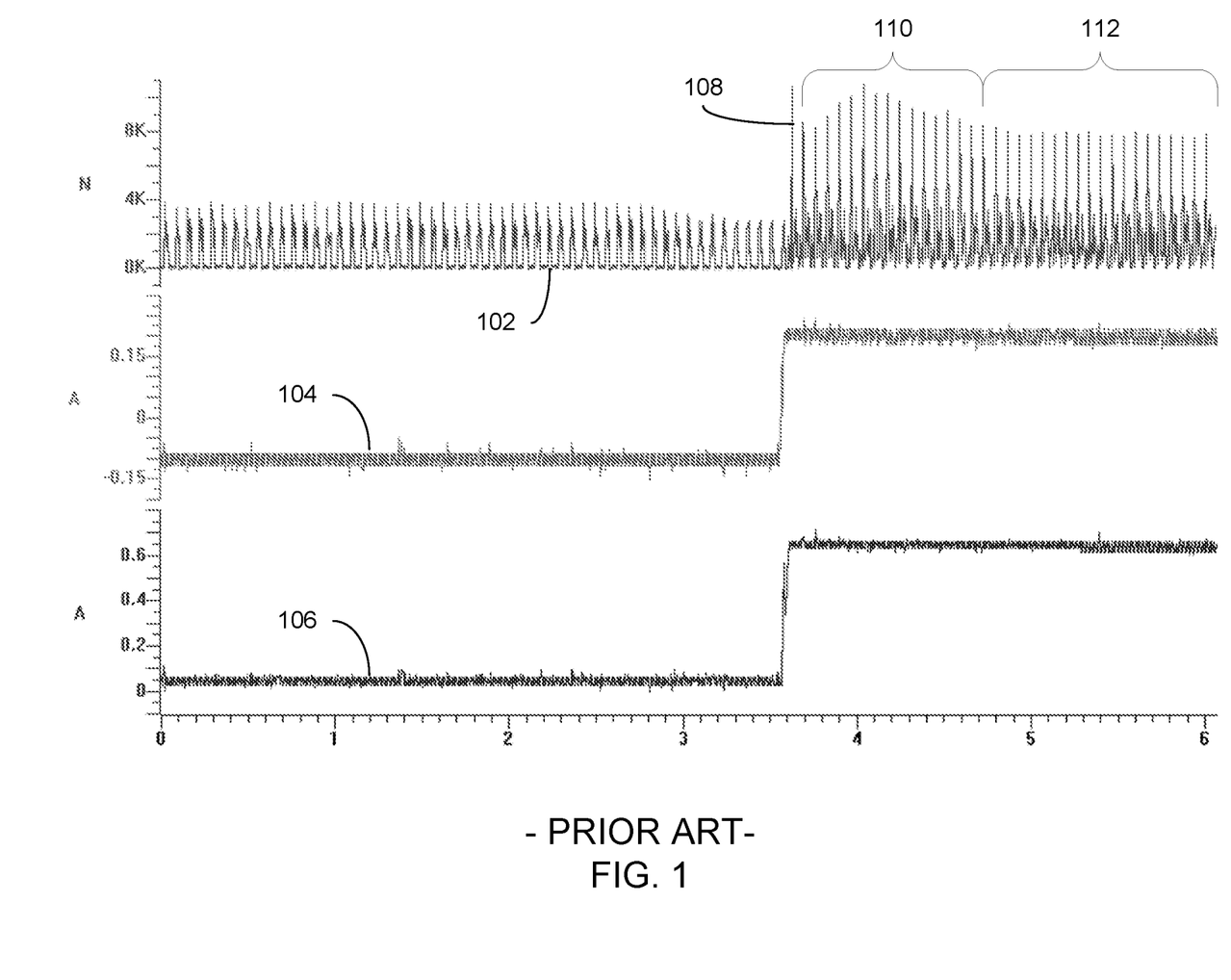
FIG. 1 is time plot of control signals and forces applied to valve train components in systems comprising exhaust and compression release engine braking subsystems and in accordance with prior art techniques.

In particular, FIG. 1 illustrates a control signal 104 used to control operation of an exhaust engine brake subsystem, another control signal 106 used to control operation of a compression release engine brake subsystem and a trace 102 illustrating the force applied to valve train components resulting from cylinder pressure as a function of time, measured in seconds. As known in the art, each peak illustrated in the trace 102 represents the peak forces applied to the valve train through each piston cycle of a given engine cylinder. When the control signals 104, 106 transition, in this example, from low to high to activate both the compression release and exhaust engine brake subsystems at approximately the same time, this results in a typical compression release transient peak 108, followed by an extended period of unusually high peaks 110 prior to normal, steady state operation 112. As a result of the period of excessively high loads 110, damage may be inflicted on the valve train or overhead.

Techniques that overcome these problems would represent a welcome advance in the art.

SUMMARY

The instant disclosure describes methods and apparatuses for determining exhaust brake failure. In an embodiment, a controller of an internal combustion engine receives a request to activate an exhaust brake subsystem and, in response thereto, activates the exhaust braking subsystem. The controller thereafter determines that at least one parameter of the exhaust system, an intake subsystem or both compares unfavorably with at least one threshold. When the at least one parameter compares unfavorably with the at least one threshold, the controller determines that the exhaust braking subsystem has failed. The determination that the at least one parameter compares unfavorably with the at least one threshold may be based on a determination that backpressure in the exhaust system is lower than a backpressure threshold and/or a determination that boost pressure in the intake subsystem is higher than a threshold.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 2:
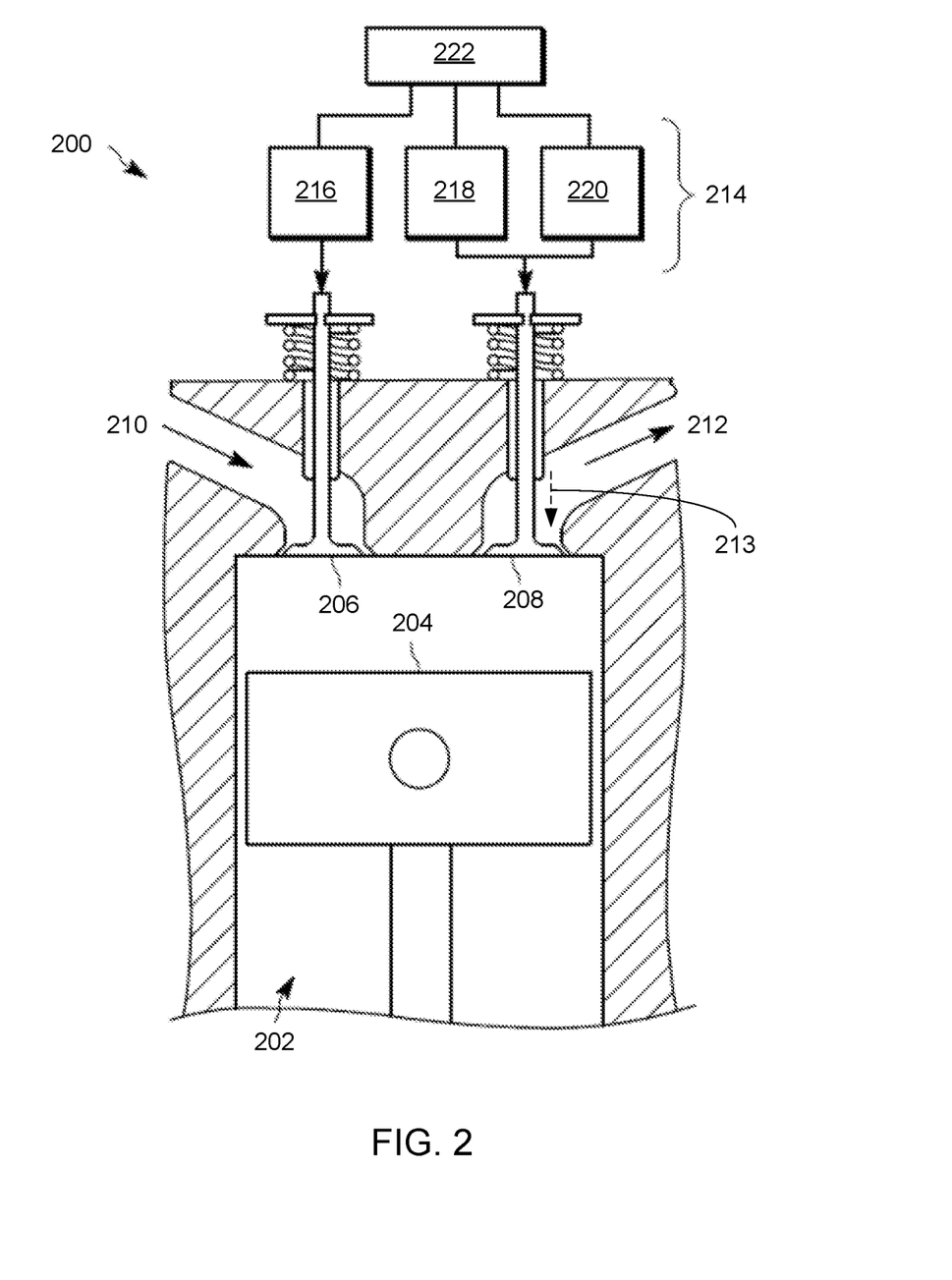
FIG. 2 is a schematic, cross-sectional view of an engine cylinder and valve actuation systems in accordance with the instant disclosure.

FIG. 2 schematic, cross-sectional view of an engine cylinder and valve actuation systems in accordance with the instant disclosure. As shown, the engine cylinder 202 has disposed therein a piston 204 that reciprocates upward and downward repeatedly during both positive power generation (i.e., combustion of fuel to drive the piston 204) and engine braking operation (i.e., use of the piston to achieve air compression) of the cylinder 202. At the top of the cylinder 202, there may be at least one intake valve 206 and at least one exhaust valve 208. The intake valve 206 and the exhaust valve 208 may be opened and closed to provide communication with an intake gas passage 210 and an exhaust gas passage 212, respectively. The intake valve 206 and exhaust valve 208 may be opened and closed by valve actuating subsystems 214, such as, for example, an intake valve actuating subsystem 216, a positive power exhaust valve actuating subsystem 218, and an engine braking exhaust valve actuating subsystem 220. The positive power exhaust valve actuating subsystem 218 and the engine braking exhaust valve actuating subsystem 220 may be integrated into a single system in some embodiments or separate in others.

The valve actuating subsystems 214 may include any number of mechanical, hydraulic, hydro-mechanical, electromagnetic, or other type of valve train element. For example, as known in the art, the exhaust valve actuating subsystems 218 and/or 220 may include one or more cams, cam followers, rocker arms, valve bridges, push tubes, etc. used to transfer valve actuation motion to the exhaust valves 208. Additionally, one or more lost motion components may be included in any of the valve actuation subsystems 214 whereby some or all of the valve actuation motions typically conveyed by the valve actuation subsystems 214 are prevented from reaching the valves 206, 208, i.e., they are "lost."

The valve actuating subsystems 214 may actuate the intake valve 206 and exhaust valve 208 to produce engine valve events, such as, but not limited to: main intake, main exhaust, compression release braking, and other auxiliary valve actuation motions. The valve actuating subsystems 214 may be controlled by a controller 222 to selectively control, for example, the amount and timing of the engine valve actuations. The controller 222 may comprise any electronic, mechanical, hydraulic, electrohydraulic, or other type of control device for communicating with the valve actuating subsystems 214 and causing some or all of the possible intake and exhaust valve actuations to be transferred to the intake valve 206 and the exhaust valve 208. The controller 222 may include a microprocessor and instrumentation linked to other engine components to determine and select the appropriate operation of the engine valves based on inputs such as engine speed, vehicle speed, oil temperature, coolant temperature, manifold (or port) temperature, manifold (or port) pressure, cylinder temperature, cylinder pressure, particulate information, other exhaust gas parameters, driver inputs (such as requests to initiate engine braking), transmission inputs, vehicle controller inputs, engine crank angle, and various other engine and vehicle parameters. In particular, and in accordance with embodiments described in further detail below, the controller may activate the engine braking exhaust valve actuating subsystem 220 in response to a request for engine braking.

As noted above, pressure developed in the cylinder 202 through reciprocation of the piston 204 places loads on the valve actuation subsystems 214 during opening of the engine valves 206, 208. For example, when the piston 204 is at or near its bottom dead center position, pressure within the cylinder 202 will be relatively low and the load placed on the valve actuation subsystems 214 when opening either valve 206, 208 will be relatively low as well. On the other hand, when the piston 204 is at or near its top dead center position, pressure within the cylinder 202 will be relatively high and the load placed on the valve actuation subsystems 214 when opening either valve 206, 208 will be relatively high as well. This latter scenario is particularly true where, unlike positive power generation operation, the exhaust valve 208 is initially opened when the piston 204 is very close to its top dead center position.

FIG. 2 further illustrates the concept of back pressure 213 where, in this context, the resistance of hydraulic fluid flow of the exhaust system manifests itself as a force applied to the exhaust valve 208 in opposition to the pressure induced in the cylinder 202. As known in the art, activation of an exhaust braking system results in increased back pressure within the exhaust system. However, such increased back pressure may take a period of time to develop. Given this, and with reference once again to FIG. 1, the period of excessively high loads 110, referred to herein as a mass flow inertia pulse (MFIP), results from the sudden application of the cylinder pressures developed by the compression release braking subsystem prior to development of increased back pressure that would otherwise oppose the load applied to the valve train 218, 220.

Figure 3:
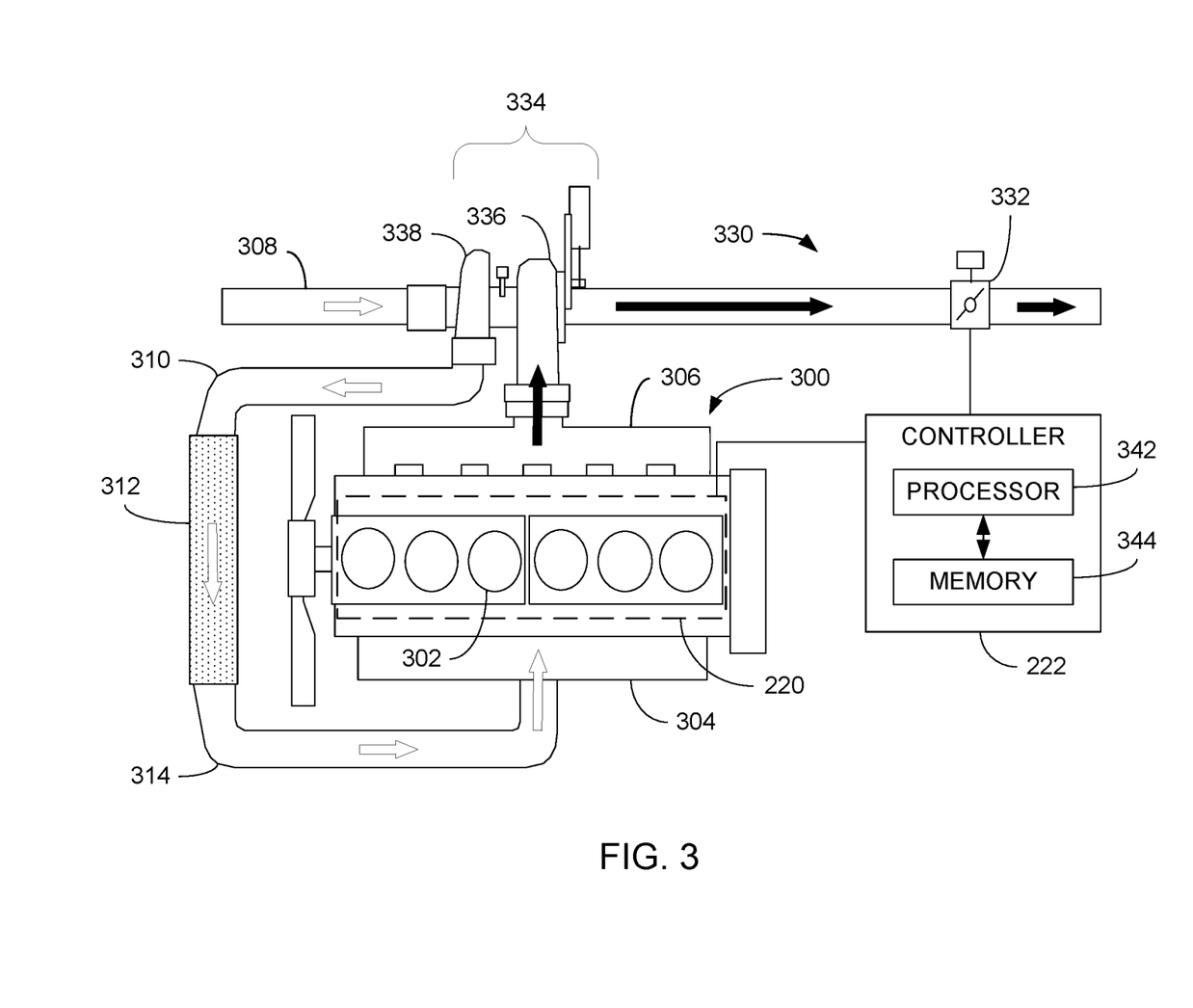
FIG. 3 is a schematic illustration of an internal combustion engine in accordance with the instant disclosure.

Referring now to FIG. 3, an internal combustion engine 300 is shown operatively connected to an exhaust system 330. The internal combustion engine 300 comprises a plurality of cylinders 302, an intake manifold 304 and an exhaust manifold 306. As will be appreciated by those of skill in the art, the number and configuration of the cylinders 302 as well as the configuration of the intake and exhaust manifolds 304, 306 may differ from the illustrated example as a matter of design choice. FIG. 3 also schematically illustrates a compression release braking subsystem 220 for actuating one or more exhaust valves, as known in the art. In turn, the exhaust system 330 comprises, in addition to the usual piping, an exhaust braking subsystem 332 and, in the illustrated embodiment, a turbocharger 334. As known in the art, the turbocharger 334 may comprise a turbine 336 operatively connected to a compressor 338 in which exhaust gases (illustrated by the black arrows) output by the exhaust manifold 306 rotate the turbine 336 that, in turn, operates the compressor 338. The exhaust braking subsystem 332 may comprise any of a number of commercially available exhaust brakes.

As further shown in FIG. 3, various components may form an intake system that provide air to the intake manifold 304. In the illustrated example, an inlet pipe 308 provides ambient air to the compressor 338 that, in turn, provides pressurized air through a compressor outlet pipe 310 to a charge air cooler 312 that cools down the pressurized air. The output of the charge air cooler 312 routes the cooled, compressed air to an intake manifold inlet 314. As known in the art, the level of compression (or boost pressure) provided by the compressor 338 depends upon the pressure of the exhaust gases escaping through the exhaust system 330.

As further shown in FIG. 3, a controller 222 is provided and operatively connected to the compression release braking subsystem 220 and the exhaust braking subsystem 332. In this manner, the controller 222 controls operation of both the compression release braking subsystem 220 and the exhaust braking subsystem 332. In the illustrated embodiment, the controller 222 comprises a processor or processing device 342 coupled a storage component or memory 344. The memory 204, in turn, comprises stored executable instructions and data. In an embodiment, the processor 342 may comprise one or more of a microprocessor, microcontroller, digital signal processor, co-processor or the like or combinations thereof capable of executing the stored instructions and operating upon the stored data. Likewise, the memory 204 may comprise one or more devices such as volatile or nonvolatile memory including but not limited to random access memory (RAM) or read only memory (ROM). Processor and storage arrangements of the types illustrated in FIG. 2 are well known to those having ordinary skill in the art. In one embodiment, the processing techniques described herein are implemented as a combination of executable instructions and data within the memory 344 executed/operated upon by the processor 342.

While the controller 222 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the controller 222 may include a greater or lesser number of components than those illustrated. Once again, those of ordinary skill in the art will appreciate the wide number of variations that may be used is this manner. Further still, although a single controller 222 is illustrated in FIG. 3, it is understood that a combination of such processing devices may be configured to operate in conjunction with, or independently of, each other to implement the teachings of the instant disclosure.

Figure 4:
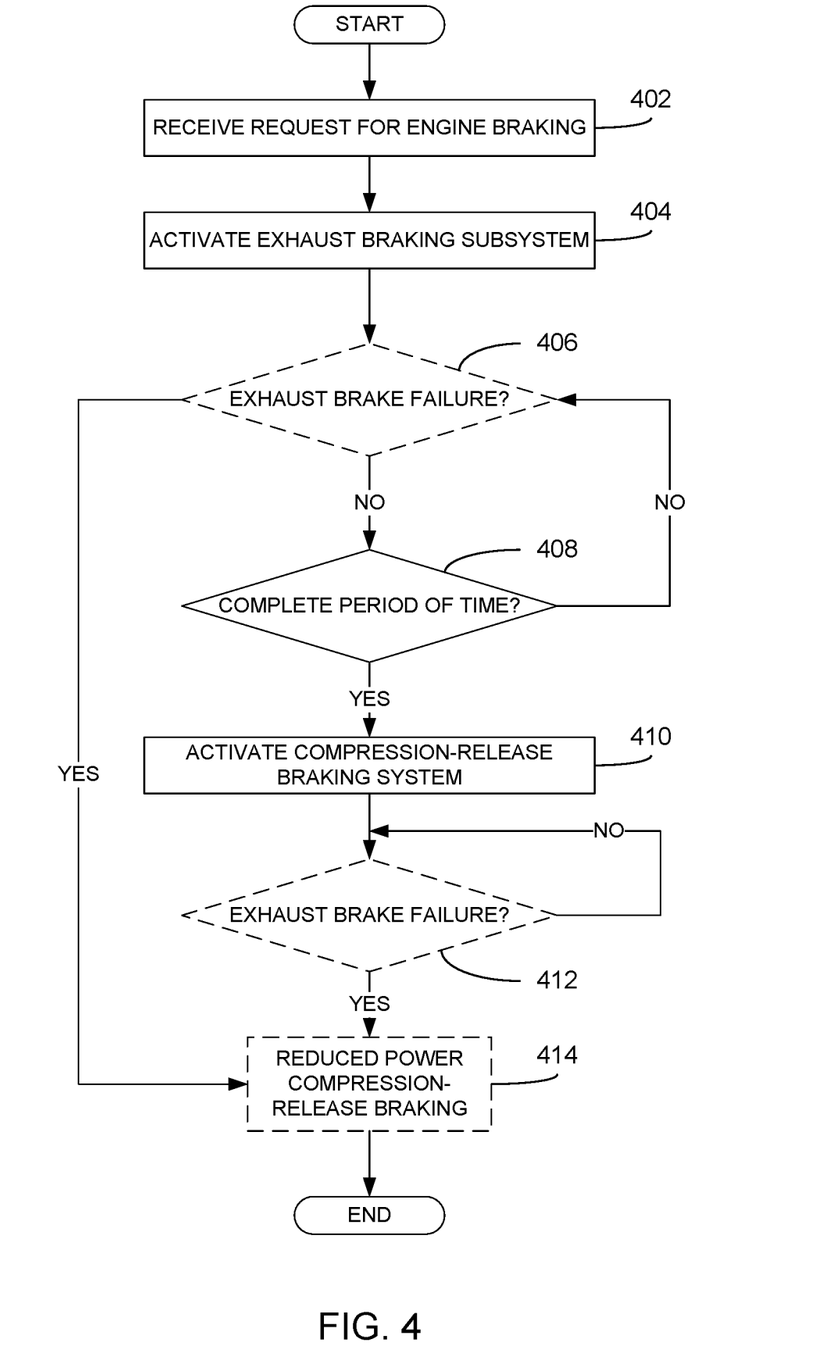
FIG. 4 is a flowchart illustrating processing in accordance with the instant disclosure.
Figure 5:
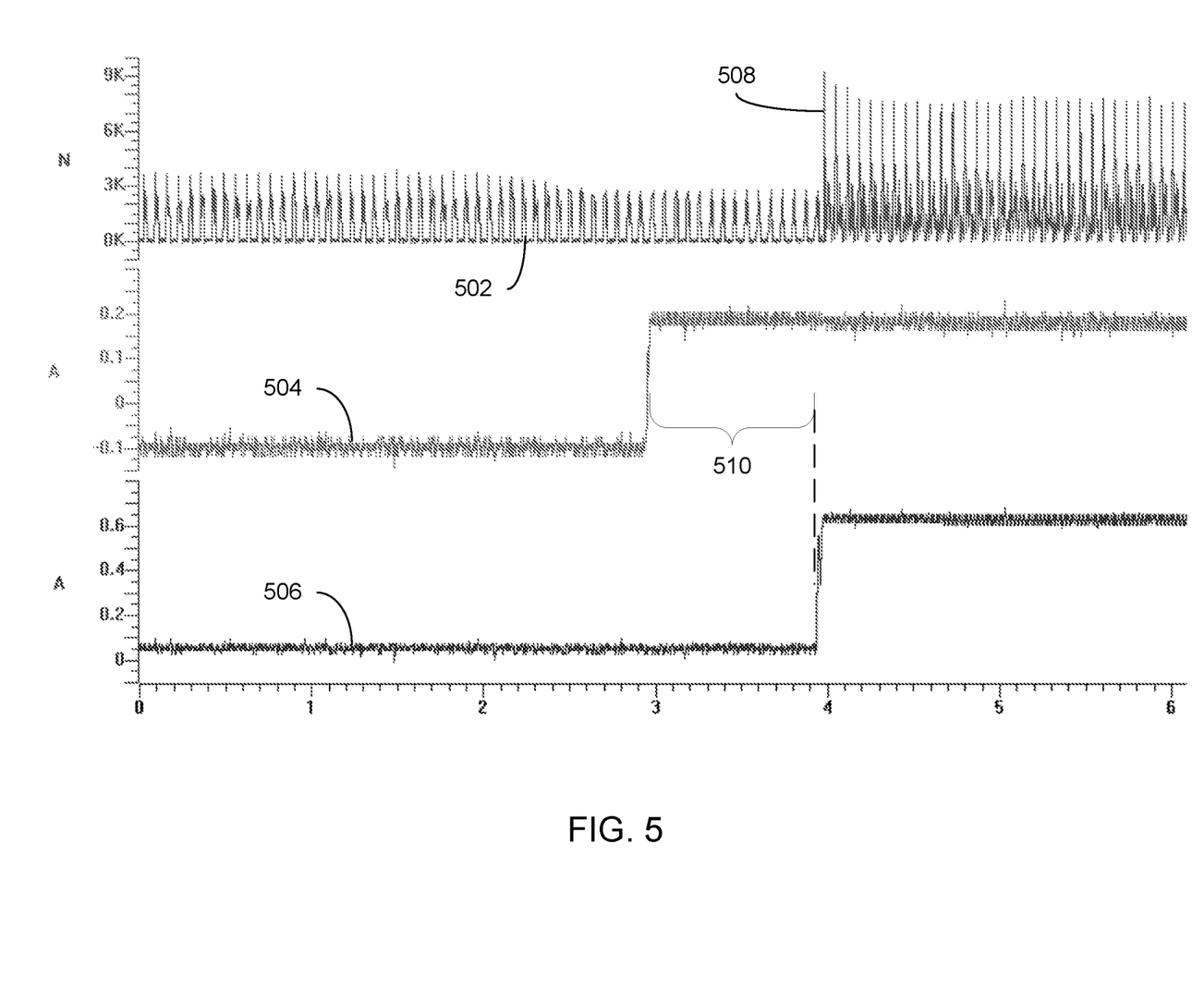
FIG. 5 is a is time plot of control signals and forces applied to valve train components in systems comprising exhaust and compression release engine braking subsystems and in accordance with the instant disclosure.

Referring now to FIG. 4, processing in accordance with the instant disclosure is illustrated. In particular, the processing illustrated in FIG. 4 may be implemented by the controller 222 as described above. Beginning at block 402, the controller receives a request for engine braking. As noted above, such a request may be provided in the form of a user input such as through activation of a switch or other user-selectable mechanism as known in the art. Regardless, responsive to the received request, processing continues at block 404 where the controller 404 activates the exhaust braking subsystem. As known in the art, activation of a braking subsystem (whether exhaust, compression release or another type) may be effected through control, for example, of a solenoid that, in turn, controls the flow of hydraulic fluid to a lost motion system or actuator that initiates the engine braking operation. An example of a signal 504 used for this purpose is illustrated in FIG. 5 where the transition of the signal 504 from a low voltage to a high voltage corresponds to activation of the exhaust braking system. Those having skill in the art will appreciate that the particular form of control signals illustrated herein are not by way of limitation and, in practice, other forms (e.g., high to low transitioning) may be equally employed.

Thereafter, at block 408, a determination is made if a period of time has been completed subsequent to the activation of the exhaust braking system. That is, substantially simultaneous with the activation of the exhaust braking subsystem, the controller initiates a timer measuring the period of time in accordance with well-known techniques and then continually checks 408 whether the timer has expired (in this example). In an embodiment, the period of time is sufficient in length to permit activation of the exhaust break to develop increased back pressure in the exhaust system such that the loads placed upon the exhaust valve train may the cylinder pressure may be more effectively opposed, thereby minimizing or eliminating any period of high loads 110, as described above. In practice, the desired period of time will be function of engine speed, exhaust gas flow and volume of the exhaust system and will therefore necessarily vary depending upon the specific implementation and operation of the engine and exhaust system. For example, testing has revealed that in some commonly available engine and exhaust systems, the period of time should be at least one second.

Regardless of the specific period of time employed, once the period of time has passed, processing continues at block 410 where the compression release braking subsystem is activated. This is once again shown in FIG. 5 where, after the completion of the period of time 510, a control signal 506 for the compression release braking subsystem transitions from a low voltage to a high voltage. Consequently, as further shown in FIG. 5, the forces applied to the valve train are increased beginning with a typical compression release transient 508. However, unlike the system illustrated in FIG. 1, there is no or very little MFIP-induced period of excessively high loads 110. Once again, the backpressure developed during the period of time 510 during which only the exhaust braking subsystem is activated significantly counteracts the otherwise high loads 110 that would result.

As known in the art, failure of an exhaust braking subsystem can have significant deleterious effects on an engine. If the exhaust braking subsystem fails in a way in which the restriction in the exhaust system is maintained even after the exhaust braking subsystem has been deactivated, there will be significant increase in back pressure during positive power generation, which can decrease positive power generation and, in turbocharger-equipped systems, decrease the boost pressure. On the other hand, if the exhaust braking subsystem fails in a way in which the restriction in the exhaust system is not provided when the exhaust braking subsystem has been activated, there will be significant decrease in back pressure during engine braking that, as described above, can result in damage to valve train components.

In order to avoid the potentially damaging effects of failure of the exhaust braking subsystem during engine braking in a combined exhaust/compression release engine braking system, the otherwise optional processing (illustrated with dotted lines) shown in FIG. 5 may also be performed. It is noted that, while the optional processing in FIG. 5 is shown in conjunction with the described method for minimizing or eliminating the high valve train loads 110 described above, this is not a requirement of the instant disclosure. That is, the otherwise optional processing in FIG. 5 (particularly blocks 406 and 414) in conjunction with the processing of blocks 402 and 404 may be implemented separately, e.g., in a system in which only an exhaust braking subsystem is provided. Thus, for example, a determination of whether the exhaust brake has failed may be performed in response to activation of only the exhaust brake, i.e., a request received by the controller to cause the exhaust brake to restrict flow of exhaust out of the exhaust system.

Regardless, in this additional embodiment, subsequent to activation of the exhaust braking subsystem, it is determined at block 406 whether there has been a failure of the exhaust braking subsystem. In practice, this may be achieved in several ways. In particular, where the exhaust braking subsystem fails to provide the necessary restriction on the exhaust system, this failure can be detected when it is determined that back pressure in the exhaust system is below a threshold. For example, and with reference to FIG. 3, this could be determined through measurement of pressure within the exhaust manifold or that portion of the exhaust system between the turbocharger 334 and the exhaust braking subsystem 332. In yet another embodiment, it is appreciated that presence of the restriction in the exhaust system through normal operation of the exhaust braking subsystem will serve to reduce the boost pressure at the outlet of the compressor 338 (or as measured, for example, in the intake manifold 304 or either before or after the charge air cooler 312). Consequently, a measurement of a sustained or even increased boost level after activation of the exhaust braking subsystem is indicative of a failure of the exhaust braking subsystem to provide the necessary restriction. In an embodiment, the determination of the measured parameter (i.e., exhaust backpressure and/or boost pressure) is performed based on multiple data samples taken over a period of time and subsequently averaged. In this case, the determined average is compared to the relevant threshold when determining whether a failure of the exhaust brake has occurred.

Regardless of the manner in which it is determined, if no failure of the exhaust braking subsystem is determined at block 406, processing continues as described above at block 408. However, if a failure is detected at block 406, processing continues at block 414 where, rather than activating the compression release braking subsystem in the usual manner at block 410, the compression release braking system is operated in a reduced braking power mode. As used herein, a reduced braking power mode is characterized by less than the full braking power that could otherwise be provided by the compression release braking subsystem down to, and including, no braking power at all. For example, to achieve a reduced braking power mode, the controller could operate the compression release braking subsystem in such a manner that only a portion of the compression release braking subsystem is operated. Thus, in one embodiment, not all of the cylinders may be operated in accordance with compression release engine braking techniques. In another embodiment, where possible, the timing of the opening of the exhaust valves during compression release braking could be modified such that they are not opened at or close to periods of peak cylinder pressure, thereby decrease the loads that would otherwise be placed upon the valve trains.

In yet another embodiment, where possible, the controller may also configure one or more components of the exhaust system (other than the exhaust braking subcomponent) to increase the back pressure in the exhaust system. For example, and with reference to FIG. 3, if the turbocharger 334 is a so-called variable geometry turbocharger (VGT) as known in the art, the configuration of the turbocharger (for example, the aspect ratio of the turbine blade in the turbine 336) may be adjusted to increase the back pressure of the exhaust system 330.

Further still, even when no failure is detected at block 406 and compression release braking is activated as set forth in block 410, it may be desirable to continue checking for failure of the exhaust braking subsystem as illustrated by block 412. In the case that such a failure is detected even after activation of the compression release braking subsystem, processing may continue at block 414 where a reduced braking power mode of operation is employed, as described above.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. In a controller for use with an internal combustion engine operatively connected to an exhaust system, wherein the exhaust system comprises an exhaust braking subsystem, and wherein the controller is in communication with the exhaust braking subsystem, a method for determining failure of the exhaust brake subsystem comprising:
   receiving, by the controller, a request for engine braking via a compression-release braking subsystem of the internal combustion engine;
   responsive to the request for engine braking, activating, by the controller, the exhaust braking subsystem;
   determining, by the controller, that at least one parameter of the exhaust system, an intake subsystem of the internal combustion engine or both compares unfavorably with at least one threshold;
   when the at least one parameter compares unfavorably with the at least one threshold, determining, by the controller, that the exhaust braking subsystem has failed; and
   activating, by the controller, the compression-release braking subsystem when the controller determines that the exhaust braking subsystem has not failed.

2. The method of claim 1, wherein determining that the at least one parameter compares unfavorably with the at least one threshold further comprises:
   determining, by the controller, that backpressure in the exhaust system is lower than a backpressure threshold.

3. The method of claim 2, wherein determining that the backpressure is lower than the backpressure threshold further comprises:
   determining, by the controller, an average of multiple samples of the backpressure to provide an average backpressure; and
   comparing, by the controller, the average backpressure with the backpressure threshold.

4. The method of claim 1, wherein determining that the at least one parameter compares unfavorably with the at least one threshold further comprises:
   determining, by the controller, that boost pressure in an intake subsystem is higher than a threshold.

5. The method of claim 4, wherein determining that the boost pressure is higher than the threshold further comprises:
   determining, by the controller, an average of multiple samples of the boost pressure to provide an average boost pressure; and
   comparing, by the controller, the average boost pressure with the threshold.

6. A controller for use with an internal combustion engine operatively connected to an exhaust system, wherein the exhaust system comprises an exhaust braking subsystem, and wherein the controller is in communication with the exhaust braking subsystem, the controller comprising:
   at least one processing device; and
   memory having stored thereon executable instructions that, when executed by the at least one processing device cause the at least one processing device to:
   receive a request for engine braking via a compression-release braking subsystem of the internal combustion engine;
   responsive to the request to activate the exhaust brake subsystem, activate the exhaust braking subsystem;
   determine that at least one parameter of the exhaust system, an intake subsystem of the internal combustion engine or both compares unfavorably with at least one threshold; and when the at least one parameter compares unfavorably with the at least one threshold, determine that the exhaust braking subsystem has failed; and activate the compression-release braking subsystem when it is determined that the exhaust braking subsystem has not failed.

7. The controller of claim 6, wherein those executable instructions that cause the at least one processor to determine that the at least one parameter compares unfavorably with the at least one threshold are further operative to cause the at least one processor to:

determine that backpressure in the exhaust system is lower than a backpressure threshold.

8. The controller of claim 7, wherein those executable instructions that cause the at least one processor to determine that the backpressure is lower than the backpressure threshold are further operative to cause the at least one processor to:

determine an average of multiple samples of the backpressure to provide an average backpressure; and compare the average backpressure with the backpressure threshold.

9. The controller of claim 6, wherein those executable instructions that cause the at least one processor to determine that the at least one parameter compares unfavorably with the at least one threshold are further operative to cause the at least one processor to:

determine that boost pressure in an intake subsystem is higher than a threshold.

10. The controller of claim 9, wherein those executable instructions that cause the at least one processor to determine that the boost pressure is higher than the threshold are further operative to cause the at least one processor to:

determine an average of multiple samples of the boost pressure to provide an average boost pressure; and compare the average boost pressure with the threshold.

* * * * *